United States Patent [19]

Lodoen

[11] Patent Number: 4,871,818
[45] Date of Patent: Oct. 3, 1989

[54] POLYESTER-BASED SPANDEX FILAMENT

[75] Inventor: Gary A. Lodoen, Fishersville, Va.

[73] Assignee: E. I. Du Pont De Nemours and Company, Wilmington, Del.

[21] Appl. No.: 213,895

[22] Filed: Jun. 30, 1988

Related U.S. Application Data

[60] Continuation-in-part of Ser. No. 78,153, Jul. 27, 1987, Pat. No. 4,767,828, which is a division of Ser. No. 913,406, Sep. 30, 1986, abandoned.

[51] Int. Cl.$^4$ ............................................. C08F 20/00
[52] U.S. Cl. ........................................ 525/440; 528/61; 528/64; 528/66; 528/68; 528/83; 528/85; 528/288; 528/289; 528/906
[58] Field of Search ................... 525/440; 528/61, 64, 528/66, 68, 83, 85, 288, 289, 906

[56] References Cited

U.S. PATENT DOCUMENTS

| | | | |
|---|---|---|---|
| 2,621,166 | 12/1952 | Schmidt | 528/61 |
| 2,956,961 | 10/1960 | Kibler et al. | 428/262 |
| 3,009,762 | 11/1961 | Kohrn et al. | 264/184 |
| 3,009,765 | 11/1961 | Slovin et al. | 264/184 |
| 3,097,192 | 7/1963 | Schilit | 528/61 |
| 3,211,701 | 10/1965 | Muller et al. | 525/440 |
| 3,481,905 | 12/1969 | Weiden et al. | 528/64 |
| 3,496,144 | 2/1970 | Kunde et al. | 528/61 |
| 3,506,617 | 4/1970 | Collardeau et al. | 528/61 |
| 3,507,834 | 4/1970 | Nittbecker | 528/64 |
| 3,907,863 | 9/1975 | Voss | 560/91 |
| 3,926,909 | 12/1975 | Wei | 524/236 |
| 3,979,363 | 9/1976 | Eberius et al. | 525/440 |
| 3,994,881 | 11/1976 | Altau et al. | 528/68 |
| 4,340,527 | 7/1982 | Martin | 524/432 |
| 4,452,954 | 6/1984 | Schade et al. | 525/440 |
| 4,548,975 | 10/1985 | Lewis | 524/147 |
| 4,694,049 | 9/1987 | Morita et al. | 525/440 |
| 4,767,828 | 8/1988 | Lodoen | 525/440 |
| 4,772,677 | 9/1988 | Kausch et al. | 528/61 |

Primary Examiner—John Kight
Assistant Examiner—S. A. Acquah

[57] ABSTRACT

A polyester-based spandex filament or film is provided. The filaments when used swim-wear fabrics provide the fabrics with increased resistance to mildew-induced degradation. The filaments are formed from a spandex derived substantially from a poly(2,2-dimethyl-1,3-propylene 1,12-dodecanedioate) glycol having no more than 15 milliequivalents of glycol acidity per kilogram of glycol, which glycol is capped with an organic diisocyanate and then chain-extended with an aliphatic diamine.

7 Claims, 3 Drawing Sheets

POLYESTER-BASED SPANDEX FILAMENT

REFERENCE TO RELATED APPLICATIONS

This application is a continuation-in-part application of pending prior application Ser. No. 78,153, filed July 7, 1987, which in turn was a divisional application of application Ser. No. 913,406, filed on Sept. 30, 1986, now abandoned.

BACKGROUND OF THE INVENTION

1. Field of the Invention

This invention relates to an elastic filament formed from a spandex polymer derived from a hindered polyester, an organic diisocyanate and an aliphatic diamine chain extender. The invention particularly concerns such a filament wherein the polyester is derivable from 2,2-dimethyl-1,3-propane diol (neopentyl glycol) and 1,12-dodecanedioic acid. The spandex filaments of the invention have improved resistance to degradation by mildew attack.

2. Description of the Prior Art

Elastic filaments of polyester-based spandex polymer can be prepared from a hydroxyl-terminated polyester which is capped with an organic diisocyanate and then reacted with an aliphatic diamine chain extender. The polyester forms what is called the "soft segment" of the polymer; the diisocyanate and diamine form the so-called "hard segment". The polymer can then be formed into filaments or films by known techniques. For example, filaments may be formed by dry spinning. Many such polyester-based spandex filaments are known. Some have enjoyed considerable commercial success, but their value could be further enhanced by certain improvements. For example, in swim-wear fabrics, although such filaments usually have adequate resistance to attack by swimming-pool chlorine, the filaments often degrade because of mildew attack. Accordingly, an object of the present invention is to provide a polyester-based spandex filament that has satisfactory elastic and tensile characteristics and satisfactory chlorine-resistance, but that also resists degradation caused by mildew attack.

Many hydroxyl-terminated polyesters made from α,ω-dicarboxylic acids and glycols have been disclosed for use in making the polyester-based spandex polymers. Generally, a preference is disclosed for acids that contain ten or fewer carbon atoms. However, none of the disclosures address the problem of mildew resistance or specifically mention poly(2,2-dimethyl-1,3-propane dodecanedioate) as a soft segment of a polyester-based spandex filament.

For example, U.S. Pat. Nos. 3,009,762 (Kohrn et al) and 3,009,765 (Slovin et al) disclose such hydroxyl-terminated polyesters derived from glycols and saturated organic dicarboxylic acids, the glycols and acids each having from 4 to 20 carbon atoms. These patents disclose that preferred polyesters precursors have a molecular weight of 1500 to 3000 and an acid value of less than 1. An acid value of 1 is equal to a glycol acidity of about 17.6 milliequivalents per kilogram (meq/kg). Among the polyesters specifically mentioned, though not exemplified, is a hindered polyester, poly(neopentyl sebacate).

U.S. Pat. No. 3,097,192 (Schilit) discloses elastic filaments of polyester-based spandex polymers and states that when the ester function is hindered, as with polyesters made with 2,5-hexane diol or 2,2-dimethyl-1,3-propane diol, the hydrolytic stability of the polymer is enhanced. In Examples II and IX, Schilit discloses a polyester-based spandex filament made with a polyester soft segment formed from sebacyl chloride and 2,2-dimethyl-1,3-propane diol. However, the tensile and elastic characteristics of the disclosed filaments are clearly in need of significant improvement.

Among the many other patents that disclose hydroxyl-terminated polyesters for segments of spandex filaments are U.S. Pat. Nos. 2,621,166 (Schmidt), 2,956,961 (Kibler et al), 3,211,701 (Muller et al), 3,481,905 (Weiden et al), 3,496,144 (Kunde et al), 3,506,617 (Collardeau et al) and 3,907,863 (Voss).

From a practical standpoint, some degradation of the spandex filament from mildew attack can be tolerated without it being objectionable to users of fabrics containing the filaments. However, the utility of the polyester-based spandex filaments would be much improved by increases in their mildew resistance.

SUMMARY OF THE INVENTION

The present invention provides an improved elastic filament or film formed from a spandex polymer that has a hindered polyester soft segment and a hard segment derived from an organic diisocyanate and an aliphatic diamine chain extender. The improved filament or film has enhanced mildew, hydrolysis and chlorine resistance, as well as unexpectedly high unload power characteristics. The improvement comprises a hindered polyester soft segment made substantially from a poly(2,2-dimethyl-1,3-propylene 1,12-dodecanedioate) glycol having a glycol acidity of no more than 15 milliequivalents per kilogram, preferably no more than 10 and most preferably no more than 5 meq/kg. The hindered polyester preferably has a molecular weight in the range of 2300 to 2700, most preferably in the range of 2400 to 2600.

In a process of the invention, the improved filament or film is formed from spandex polymer made by capping the polyester with an organic diisocyanate, preferably an aromatic diisocyanate, most preferably methylene bis(4-phenyl isocyanate) and then chain-extending the resultant isocyanate-terminated polyester with an aliphatic diamine, preferably a mixture of ethylene diamine and 1,3-diaminocyclohexane.

Preferred as-spun spandex filaments of the invention have a set of less than 25%, an unload power of at least 0.024 grams per effective dtex (g/edtex) (or 0.027 gram per effective denier(gped)) and a break elongation of at least 400%. After being heat-set, filaments of the invention have, in addition to improved mildew resistance and satisfactory chlorine and hydrolysis resistance, tensile and elastic characteristics that include a set of no more than 25%, preferably no more than 23%, an unload power of at least 0.032 g/edtex (0.036 gped) and a break elongation of at least 300%.

BRIEF DESCRIPTION OF THE DRAWING

The invention will be more readily understood by reference to the drawings, in which.

DETAILED DESCRIPTION OF PREFERRED EMBODIMENTS

Figure 1:
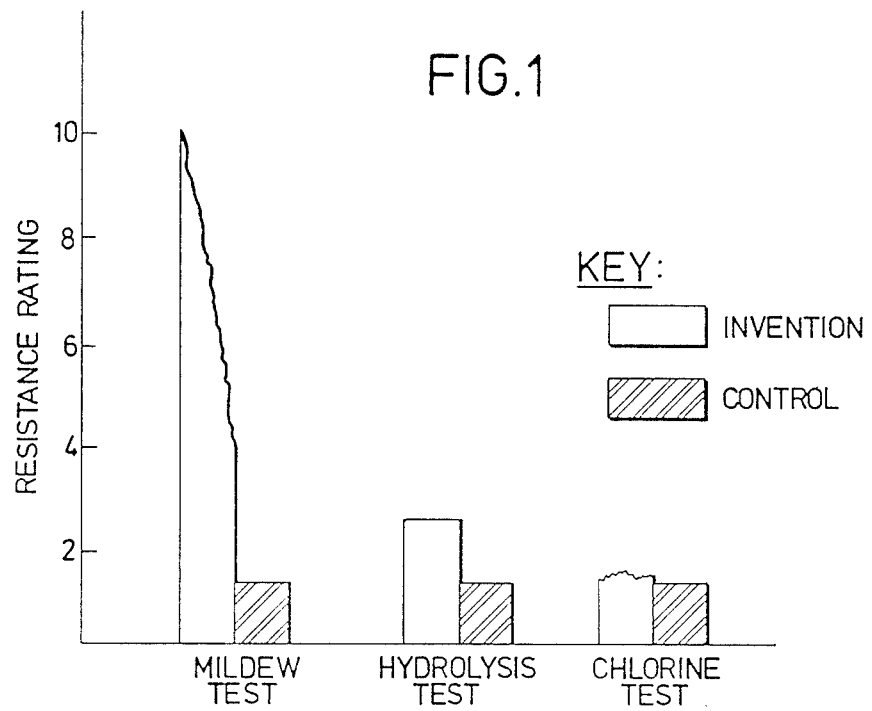
FIG. 1 presents a bar graph of the results of tests of Example 1, in which the resistance to mildew, hydrolysis and chlorine of fiber of the invention is compared with that of commercially produced spandex control fibers.

As used herein, the term "fiber" includes staple fibers and/or continuous filaments. "Spandex" has its usual definition; that is, a long chain synthetic polymer that comprises at least 85% by weight segmented polyurethane. The terms "soft segment" and "hard segment" refer to specific portions of the spandex polymer chains. The soft segments are the polyester portions of the segmented polyurethane polymer and the hard segments refer to the portions of the polymer chains that are derived from the reaction of an organic diisocyanate with a diamine chain extender. Glycol acidity, as used herein, refers to end groups, such as acid end groups, of the polyester glycol precursor which do not react with organic diisocyanates under conventional urethane-forming conditions, such as those illustrated in the examples below. The isocyanate end group content of a polymer may be referred to as the NCO content.

As noted, the spandex polymer for use in the present invention comprises a soft segment made substantially from a poly(2,2-dimethyl-1,3-propylene 1,12-dodecanedioate) glycol having a certain maximum glycol acidity. The term, "substantially made from", is intended to include in the glycol a small portion (e.g., up to as much as 25%) of copolymerized units of other aliphatic diacids and/or glycols, so long as these other acids and/or glycols do not detrimentally affect the mildew resistance, tensile and elastic properties of the final filaments or films.

In accordance with the present invention, a polyester-based spandex filament of improved mildew resistance is provided when a particular hindered polyester soft segment is included in the spandex polymer chains. The particular soft segment is poly(2,2-dimethyl-1,3-propylene 1,12-dodecanedioate).

For ease of manufacture, the polyester soft segment usually is prepared from the corresponding hydroxyl-terminated polyester. Conventional methods, such as those described in R. Hill, "Fibres from Synthetic Polymers", Elsevier Publishing Co., New York, p.144ff (1953), are satisfactory for synthesizing the polyester that will subsequently form the soft segment of the spandex polymer of the fibers. These methods include: (a) direct esterification of an acid (i.e., in this case, 1,12-dodecanedioic acid) and a glycol (i.e., in this case, 2,2-dimethyl-1,3-propane diol); (b) ester interchange between the glycol and an ester of the acid; (c) reaction of the glycol with the corresponding acid chloride; and (d) reaction of the diacetate of the glycol with the acid or its ester.

To prepare spandex polymer for the filaments or films of the invention, the soft-segment precursor, most usually in the form of a polyester diol, has a molecular weight in the range of 1,700 to 3,000, preferably in the range of 2,200 to 2,700, and most preferably in the range of 2,300 to 2,600. In addition, the polyester diol must have a glycol acidity of no more than 15, preferably no more than 10, and most preferably less than 5 meq/kg. As shown in the drawing, which is derived from the data of Example 2, low glycol acidity in the polyester diol results in superior properties in the final spandex filament. In particular, lower permanent set and higher unload power are obtained.

To form the spandex polymer for the filaments or films of the invention, the above-described polyester soft-segment precursor is reacted (or "capped" as it is sometimes called) in a conventional manner with an excess of an organic diisocyanate to form an isocyanate-terminated polyester which is then chain-extended with an aliphatic diamine. Suitable diisocyanates are methylene bis(4-phenyl isocyanate), tolylene-2,4-diisocyanate, p-phenylene-2,6-diisocyanate and the like, with the first-mentioned diisocyanate being preferred. The capping reaction preferably is carried out so that the isocyanate end group content of the capped polyester is in the range of 2.2 to 3.3 weight percent, most preferably 2.4 to 3.1. The preferred ranges of NCO contents result in a preferred combination of elongation, unload power and set in the final spandex filaments. Suitable aliphatic diamine chain extenders include ethylene diamine('EDA", also known as 1,2-diamino ethane), hydrogenated meta-phenylene diamine ("HMPD", also known as 1,3-diaminocyclohexane), propylene diamine, mixtures thereof and the like. The preferred chain extender is a mixture of EDA and HMPD, particularly preferred in a weight ratio of 80 to 20 parts, or 90 to 10 parts, respectively.

Generally, the polymerization reactions are performed in an inert solvent. Solvents such as N,N-dimethylacetamide (DMAc), N,N-dimethylformamide (DMF) or the like are suitable. The thusly prepared spandex polymer can be dry spun into filaments or formed into films, usually from the same solvent as was used for the polymerization. Dry-spun filaments or formed films can be heat-set by being maintained for 2 to 10 minutes at a temperature in the range of 145° to 165° C. while stretched to 1.5 to 3.5 times their original length and then being immersed in boiling water in a relaxed condition for at least 20 minutes. Of course, higher setting temperatures for shorter times (e.g., at 195° C. for 30 seconds) can be employed satisfactorily.

The filaments and films of the present invention have an unexpectedly good resistance to mildew. In addition, the filaments resist degradation due to swimming-pool chlorine, have excellent hydrolytic stability, especially in acid environments, and have satisfactory elastic and tensile properties. As a result, filaments of the present invention are particularly useful for swim-wear fabrics.

The resistance of polyester-based spandex filaments and films to chlorine-induced degradation can be further improved by using a spandex formed by from the poly(2,2-dimethyl-1,3-propylene 1,12-dodecanedioate) glycol employed in the spandex of the present invention and the functionally non-aromatic diisocyanates and functionally non-aromatic diamines disclosed by Altau and Stiehl in U.S. Pat. No. 3,994,881, such as tetrachloro-(meta and/or para)-xylene diisocyanate, tetrachloro-(meta and/or para)-xylylene diamine, or the like.

The following test procedures were used in the Examples and Comparisons below for measuring various parameters and properties.

Glycol acidity, which is defined herein as the concentration of ends, such as acid ends, in the polyester precursor which do not react with isocyanates under conventional urethane-forming conditions, such as those illustrated in the examples below. The glycol acidity of the hydroxyl-terminated polyester was measured by the method of ASTM-1638-67T and is reported herein in milliequivalents per kilogram of the hyrdoxyl-terminated polyester.

The molecular weights reported herein are number average molecular weights of the polyester diols. Each was determined from the hydroxyl number of the polyester diol, which was measured by the imideazolepyridine catalyst method described by S. L. Wellon et al, "Determination of Hydroxyl Content of Polyurethane Polyols and Other Alcohols", *Analytical Chemistry*, Vol. 52, No. 8, pp. 1374–1376 (July 1980).

The NCO content of isocyanate-capped hindered polyester was measured by the method of S. Siggia, "Quantitative Organic Analysis via Functional Group", 3rd Edition, Wiley & Sons, New York, pages 559–561 (1963).

Relative viscosity of the spandex polymer was determined with a 0.5% concentration solution of the polymer in N,N-dimethylacetamide solvent. Relative viscoscity is defined as the ratio of the flow times of solution to solvent at 25° C. in a capillary viscometer.

Strength and elastic properties of the spandex filaments were measured in accordance with the general method of ASTM D 2731-72. Three filaments, a 2-inch (5-cm) gauge length and a zero-to-300% elongation cycle were used for each of the measurements. "Unload Power" (i.e., the stress at an elongation of 100%) and "Set" were measured after the samples had been cycled five times at an constant elongation rate of 800% per minute and then held at the 300% extension for half a minute after the fifth extension. Stress, on unloading from this last extension, was measured and expressed as 9rams per effective denier at 100% elongation. At the end of the fifth cycle and after the sample had been allowed to recover for a half minute, the measured length of the sample was then used to calculate the set, which was expressed as a percentage of the original length of the sample. The percent elongation and tenacity at break were measured on the sixth extension cycle. Tenacity is reported in grams per denier or grams per dtex. Effective denier is the denier of the filament at 100% elongation.

Resistance to attack by mildew was measured by the general method of ASTM D-1924-70. An aqueous dispersion of aspergillus niger spores was employed. The test was performed on single-knit (four feed hosiery machine) hosiery panty fabric made with 50-denier, 17 filament nylon as companion fibers to the spandex test filaments. The spandex filaments were knitted in every fourth course without plaiting with the nylon. Before mildew testing, the fabric was washed with one half cup of laundry detergent in a home laundry washing machine set for a normal wash and rinse cycle, followed by drying in a home laundry dryer set for a permapress cycle. Square samples of the fabric measuring 3 inches (7.6 cm) on each side were then fastened under light tension over cylindrical polystyrene dishes. The samples were then innoculated with the aqueous spore dispersion. Days to first failure were then measured. Failure was recorded as the time at which a hole was evident in the fabric sample. In each test, a similar control fabric made with commercial polyester-based spandex filaments was exposed under the same conditions. The comercial polyester-based spandex yarn was Type-128 "LYCRA" spandex, available from E. I. du Pont de Nemours and Company. The polymer of the commercial yarn was formed from a 3,400-molecular-weight polyester glycol that was derived from the reaction of a 60/40 ethylene glycol/1,4-butanediol mixture with adipic acid and then capped with methylene bis(4-phenyl isocyanate) and extended with ethylene diamine. As used herein, "enhanced mildew resistance", means that a fabric, prepared with spandex fiber and exposed to mildew in accordance with the test procedures of this paragraph will require at least three, and preferably at least four, times the number of days to reach first failure as required by the control fabric of this test. The ratio of the time to failure of the test fabric versus the control fabric is referred to herein as the "mildew resistance rating".

Resistance to attack by chlorine was measured by the method described in U.S. Pat. No. 4,340,527, column 4, lines 7 through 25. The method involves immersing a test yarn, while extended to 150% of its original length, in a water bath maintained at a temperature of 22° C., at a pH of 7.5 by addition of hydrochloric acid, and at an active chlorine concentration of 3 parts per million by addition of sodium hypochlorite solution. After the exposure, the yarn is dried and its physical properties are measured, as described in the preceding paragraph. After-exposure yarn properties were then compared to the properties before exposure to determine that amount of degradation.

EXAMPLE 1

This example illustrates the manufacture of an elastic filament of the invention made from a spandex polymer having a poly(2,2-dimethyl-1,3-propylene 1,12-dodecanedioate) soft segment. Compared to commercial filaments in which the dicarboxylic acid portion of the soft segment is derived from adipic acid and a glycol portion that is not hindered, the filaments of this example have extraordinarily superior resistance to mildew, hydrolysis and chlorine.

A hydroxy-terminated polyester having a molecular weight of 2499 and a glcol acidity of 3.6 meq/kg was prepared from 1,12-dodecanedioc acid and 2,2-dimethyl-1,3-propane diol. A weight of 82.8 grams of this polyester glycol was mixed with one drop of phosphoric acid and 5 ml of cyclohexane. The mixture was stirred while being heated to a temperature of 85° C. in a nitrogen-blanketed vessel. After thirty minutes of heating, the mixture was allowed to cool to 40° C. Then, the polyester glycol was capped with an aromatic diisocyanate by adding 17.2 grams of methylene bis(4-phenylisocyanate) (MDI) to the mixture and heating the mixture at 90° C. for two hours. The capped polyester had a 3.04% concentration of isocyanate groups. After being allowed to cool to about 25° C., the mixture was dissolved in 110.6 grams of N,N-dimethylacetamide. The isocyanate-capped polyester, while still in solution, was then reacted with 70.9 grams of a mixture of aliphatic diamine chain extenders and a chain terminator in N,N-dimethylacetamide carrier. The mixture of aliphatic diamines consisted of 0.796 gram of 1,3-diaminocyclohexane (HMPD), 1.675 grams of 1,2-diaminoethane (EDA), 0.184 gram of diethylamine and 69.245 grams of N,N-dimethylacetamide. A half gram of 1,1-bis(6-methyl-3-tertiary-butyl-4-hydroxyphenyl)-butane stabilizer was added to the resultant viscous polymer solution. The polymer had a relative viscosity of 1.6.

Elastic filaments were formed from the polymer solution by conventional dry spinning techniques. Filaments of 66 denier (73 dtex) were wound up at a speed of 150 yards per minute (137 meters/min). The filaments had the following satisfactory tensile characteristics:

Fifth cycle unload power at 100% elongation 0.029 g/edtex
Fifth cycle set 24%
Break tenacity (sixth cycle) 0.72 g/dtex
Break elongation 482%

Other filaments made substantially according to the procedures of this example were tested for mildew and chlorine resistance by the test procedures described hereinbefore. The tests were performed on as-spun filaments and on filaments that had been heat set for 3 minutes at 150° C. while being held at an elongation of 150% and then immersed in boiling water in a relaxed condition for 30 minutes. The filaments also were tested for hydrolytic stability by immersing the filaments in water of pH 3 at 70° C. for one hour and then measuring the tenacity of the filaments. In each of these tests, the results on the filaments of the invention were compared to those obtained with a commercial non-hindered polyester-based control yarn (i.e., Type-128 "LYCRA" spandex) tested under the same conditions.

The test samples made according to this example exhibited four to ten times greater resistance to mildew attack than did the commercial polyester-based spandex yarns. Furthermore, the samples with the commercial yarn control exhibited a much higher severity of failure (i.e., many failure sites) at the recorded time of first failure, in contrast to the fabrics having yarns of the invention which exhibited only one small hole at time of recorded failure.

In the chlorine resistance tests, the samples made in accordance with this example exhibited about the same or somewhat better resistance to chlorine attack than did samples containing the commercial control spandex yarn.

In the hydrolytic stability test, the samples of commercial spandex filaments lost all of their tenacity, whereas those of the example retained more than 40% of their tenacity.

FIG. 1 presents a bar graph in which the results of these tests are summarized. The figure graphically shows the much greater resistance possessed by fiber of the invention to mildew, hydrolysis and chlorine in comparison to the resistance possessed by the commercially produced spandex control fiber.

EXAMPLE 2

This example illustrates how filament mechanical properties are affected by the free acidity of the poly(2,2-dimethyl-1,3-propane dodecanedioate) glycol used to manufacture hindered polyester-based spandex filaments of the invention and demonstrates the requirement for a glycol acidity in the polyester glycol of no more than 15 meq/kg.

A series of spandex filaments was made according to the general procedures of Example 1 with a soft segment derived from poly(2,2-dimethyl-1,3-propane dodecanedioate)glycol having a molecular weight of 2,400. As in Example 1, the glycol was capped with MDI to form an isocyanate-terminated polyester having a 3.1% concentration of NCO groups which was then chain extended with an 80/20 EDA/HMPD mixture. A series of the polyester glycols, each glycol having a different free acidity, was prepared by heating the glycol with a small amount of water for different times. The thusly prepared spandex polymers were dry-spun into filaments, as in Example 1. The filaments then were heat set at 150° C. for 3 minutes while be held at a 200% elongation and then immersed in boiling water for 30 minutes while in a relaxed condition. The heat-set and boiled-off filaments had the tensile and elastic properties listed below. Note that the first three samples are of the invention; the last two are comparisons, outside the invention.

| Glycol acidity meq/kg | Filament Characteristics | | | | |
| --- | --- | --- | --- | --- | --- |
|  | dtex | % set | unload g/edtex | tenacity g/dtex | elongation, % |
| 4.4 | 43 | 21 | 0.041 | 0.97 | 336 |
| 11.1 | 40 | 23 | 0.037 | 1.01 | 354 |
| 14.9 | 43 | 24 | 0.032 | 0.77 | 349 |
| 19.9 | 49 | 23 | 0.030 | 0.90 | 373 |
| 26.7 | 47 | 25 | 0.029 | 0.69 | 351 |

Figure 2:
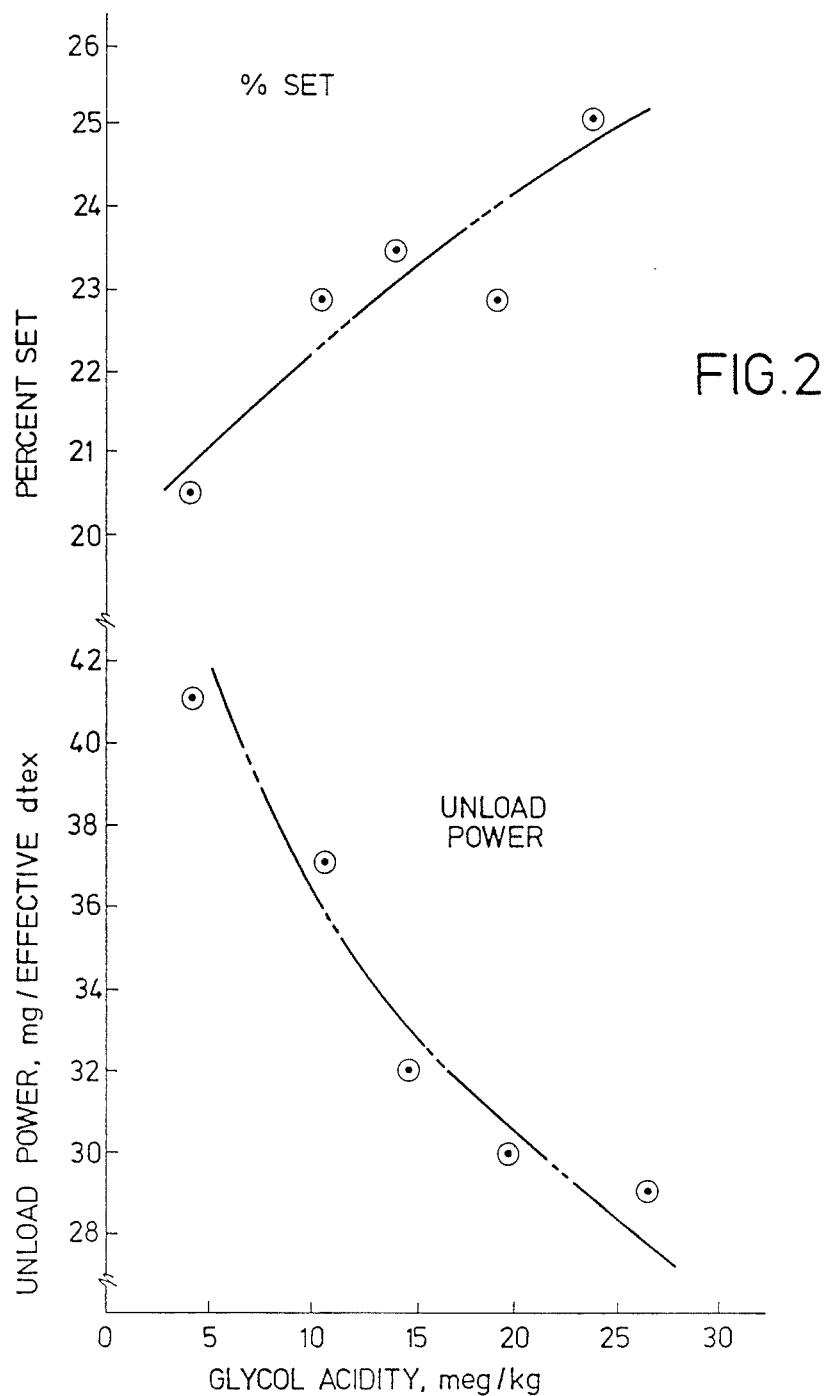
FIG. 2 is a graph of heat-set unload power and percent set of a filament of the invention as a function of the glycol acidity of a hydroxyl-terminated poly(2,2-dimethyl-1,3-propylene 1,12-dodecanedioate) used to form the soft segment of the filament spandex polymer.

The data given above, as well as other such data, show the desirability of low glycol acidity in the polyester glycol used to prepare the soft segment of the spandex filaments. Low acidity generally results in filaments having lower set and higher unload power. FIG. 2 graphically illustrates these results.

EXAMPLE 3

Figure 3:
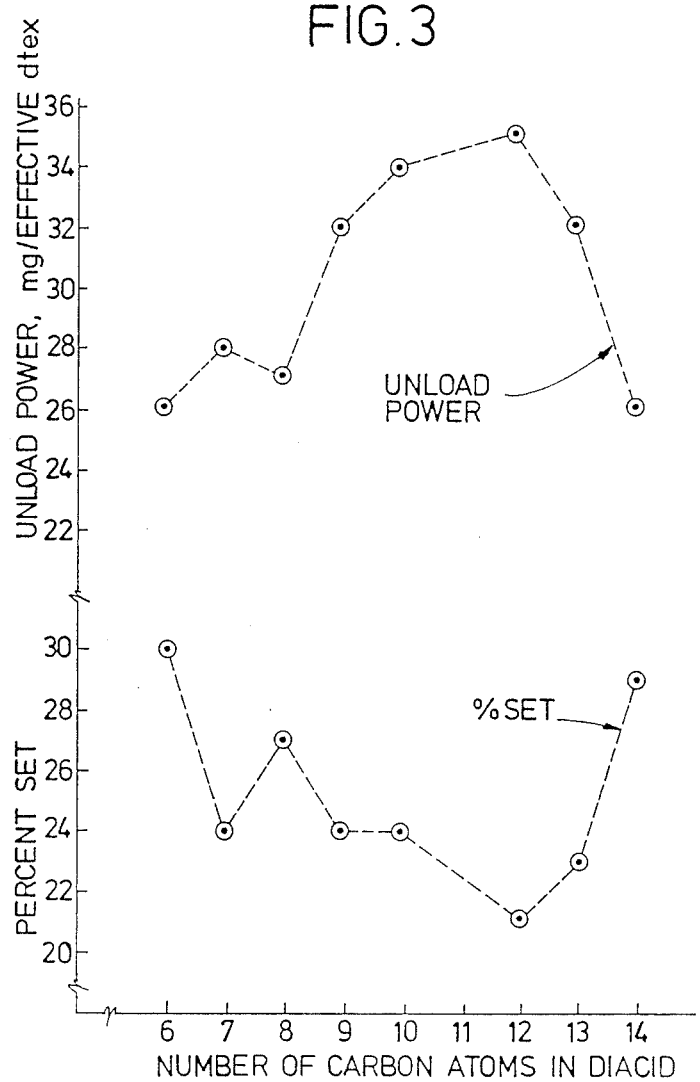
FIG. 3 illustrates the unexpected advantage in unload power possessed by fibers of the invention over similar spandex fibers made in the same way as those of the invention, except for the number of carbon atoms provided by the repeating residue of the dicarboxylic acid used to form the spandex soft segment.

This example shows the unexpected advantage in high unload power and low percent set in heat-set spandex fibers of the invention over spandex fibers made in substantially the same way but with the soft segments made with α,ω-dicarboxylic acids having carbon-chain lengths that are outside the invention (i.e., acids other than 1,12-dodecanedioic acid). FIG. 3 graphically illustrates the advantages in these heat-set fiber properties which result from using dodecanedioic acid in accordance with the invention for the soft segments of the spandex fibers instead of using other acids of the same type but of shorter or longer carbon chain length.

The general procedures of Example 1 for preparing spandex polymer were repeated with a series of polyester glycols, each having a molecular weight of about 2,400 (±100 units) and a glycol acidity of less than 5 meq/kg. These polyester glycols were prepared by reacting 2,2-dimethyl-1,3-propane diol with each of the following acids:

| Carbon Atoms | Name of Dicarboxylic Acid |
| --- | --- |
| 6 | aidpic acid |
| 7 | pimelic acid |
| 8 | suberic acid |
| 9 | azelaic acid |
| 10 | sebacic acid |
| 12 | dodecanedioic acid |
| 13 | tridecanedioic acid |
| 14 | tetradecanedioic acid |

The polyester glycols made with these acids were reacted with MDI to form capped polyester having a 3.1% (±0.1 percentage unit) concentration of isocyanate end groups. The thusly-capped polyesters were then chain-extended with an 80/20 EDA/HMPD diamine mixture in DMAc. A 1,1-bis(2-methyl-4-hydroxy-5-t-butylphenyl)butane antioxidant, amounting to 0.5% by weight of the final spandex polymer, was added to each polymer solution. The polymer solutions were then dry spun by conventional techniques into elastic filaments.

It was found that commercially-obtained sebacic acid (10 carbons) required repeated recrystallization. Without recrystallization, spandex fibers prepared with the acid had much inferior tensile and set properties. The elastic and tensile characteristics of the filaments were measured (a) in the as-spun condition and (b) after having been heat set by being heated for three minutes at 160° C. while extended to three times their original length and then relaxed in boiling water. The following table summarizes the measurements:

| Diacid Carbon Atoms | Filament Characteristics | | | | |
|---|---|---|---|---|---|
| | dtex | % set | unload g/edtex | tenacity g/dtex | elongation, % |
| a. As-spun Fibers | | | | | |
| 6 | 77 | 31 | 0.018 | 0.68 | 473 |
| 7 | 94 | 25 | 0.023 | 0.32 | 483 |
| 8 | 92 | 28 | 0.021 | 0.36 | 485 |
| 9 | 74 | 25 | 0.024 | 0.53 | 504 |
| 10 | 90 | 24 | 0.026 | 0.68 | 493 |
| 12* | 73 | 24 | 0.027 | 0.71 | 482 |
| 13 | 77 | 25 | 0.026 | 0.70 | 461 |
| 14 | 71 | 29 | 0.023 | 0.80 | 526 |
| b. Heat-set Fibers | | | | | |
| 6 | 29 | 30 | 0.026 | 0.84 | 368 |
| 7 | 41 | 24 | 0.028 | 0.65 | 371 |
| 8 | 38 | 27 | 0.027 | 0.68 | 349 |
| 9 | 29 | 24 | 0.032 | 1.01 | 348 |
| 10 | 41 | 24 | 0.034 | 0.99 | 325 |
| 12* | 31 | 21 | 0.035 | 1.35 | 330 |
| 13 | 28 | 23 | 0.032 | 1.65 | 331 |
| 14 | 33 | 28 | 0.026 | 0.97 | 347 |

*Docanedioic acid of the invention.

The preceding table shows that two of the most important characteristics of heat-set fibers, unload power and set, surprisingly and advantageously reach their respective maximum and minimum, when the 12-carbon dicarboxylic acid (i.e., 1,12-dodecanedioic acid) is used to make the soft segment of the spandex filaments. FIG. 3 further illustrates these unexpected effects.

I claim:

1. An improved elastic filament or film formed from a spandex polymer having a hindered polyester soft segment and a hard segment derived from an organic diisocyanate and an aliphatic diamine chain extender, the improvement comprising, the filament or film having enhanced mildew resistance and the hindered polyester segment being made substantially from a poly(2,2-dimethyl-1,3-propane dodecanedioate)glycol that has a glycol acidity of no more than 15 milliequivalents per kilogram.

2. A filament or film according to claim 1, wherein the hindered polyester glycol has a molecular weight in the range of 2,200 to 2,700 and a glycol acidity of no more than 10 meq/kg.

3. A filament or film according to claim 1, wherein the hindered polyester glycol has a molecular weight in the range of 2,300 to 2,600 and a glycol acidity of no more than 5 meq/kg.

4. A filament or film according to claim 1, 2 or 3 wherein the diisocyanate is methylene bis(4-phenyl isocyanate) and the chain-extender is a mixture of ethylene diamine and 1,3-diaminocyclohexane.

5. An as-spun filament according to claim any preceding claim having enhanced mildew resistance, a set of less than 25%, an unload power of at least 0.024 grams per effective dtex and a break elongation of at least 400%.

6. A heat-set elastic filament according to claim 1, 2, 3 or 4 having enhanced mildew resistance, a set of no more than 25%, an unload power of at least 0.032 g/edtex and a break elongation of at least 300%.

7. A filament accordin to claim 6, having a set of no more than 23% and an unload power of at least 0.035 g/edtex.

* * * * *